UNITED STATES PATENT OFFICE.

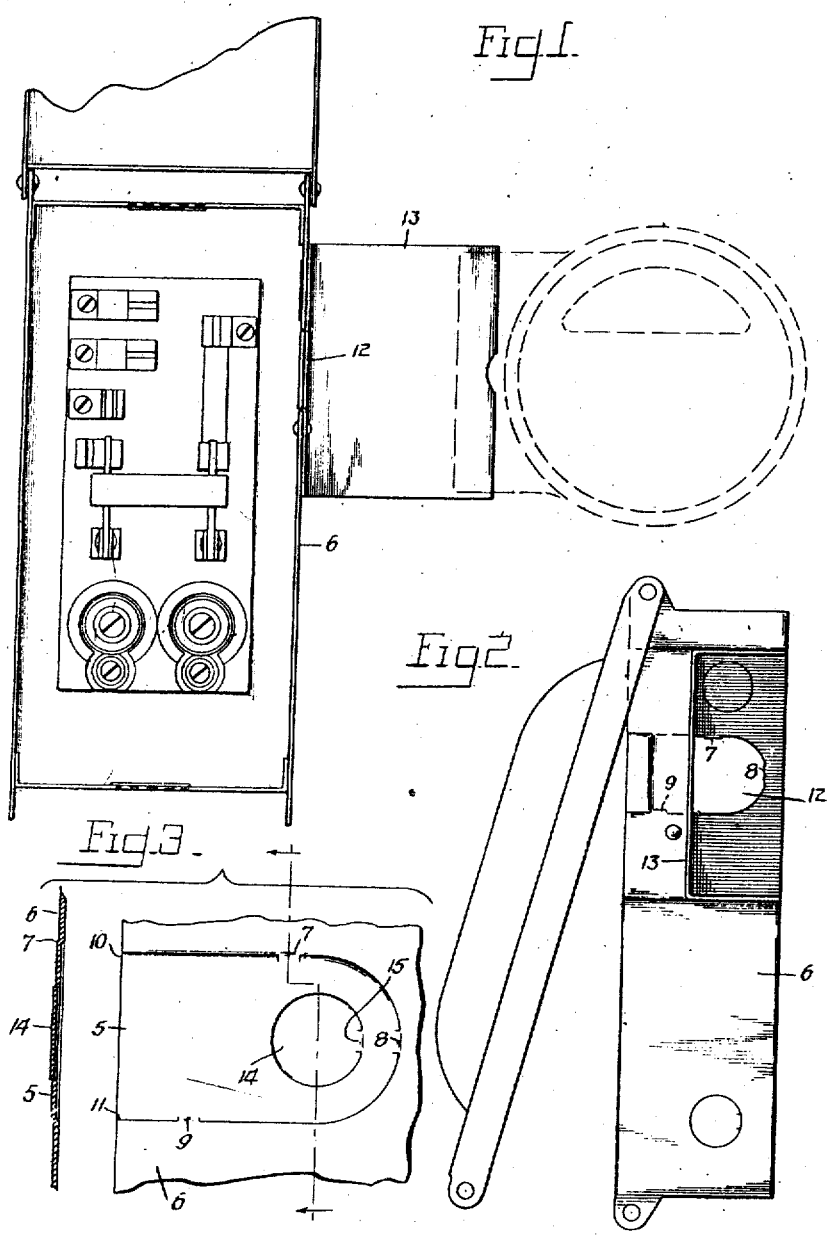

ROSCOE RATCLIFFE, OF PLAINVILLE, CONNECTICUT, ASSIGNOR TO THE TRUMBULL ELECTRIC MFG. CO., OF PLAINVILLE, CONNECTICUT, A CORPORATION OF CONNECTICUT.

ELECTRIC CUT-OUT BOX.

1,365,193.　　　　Specification of Letters Patent.　　Patented Jan. 11, 1921.

Application filed November 17, 1919. Serial No. 338,480.

*To all whom it may concern:*

Be it known that I, ROSCOE RATCLIFFE, a citizen of the United States of America, residing at Plainville, Connecticut, have invented a new and useful Electric Cut-Out Box, of which the following is a specification.

My invention relates particularly to a means or method of providing a detachable or removable section in the side of a box.

The main object is to secure a removable portion in such a way that it may be readily removed without bending or deforming the box.

In its preferred form the invention contemplates the cutting out or partially cutting out of a section of one side of the box extending from an open edge inwardly but leaving the section attached at a number of points arranged in staggered relation, that is, the points of connection are not opposite each other, but the point of connection on one side of the section is opposite an unconnected portion at the other side. Preferably none of the points of connection are at the edge of the box. The result of this construction permits the section to be detached by twisting it so as to break off or sever one point of connection at a time.

The detachable or removable section may itself have another removable portion of smaller size which is preferably connected to the main section at a point adjacent one of the points of connection between the main section and the box.

Figure 1 is a front view of the cut out box embodying my invention, showing a meter adapter attached and also a meter indicated by dotted lines.

Fig. 2 is a side view of the box also showing a meter adapter attached.

Fig. 3 shows a side view and section of the parts which particularly embody my invention.

In the form shown, I have illustrated the box as provided with four removable sections one in each side. Obviously, any number might be provided. The removable section 5 is integrally connected with the main side 6 of the box in the form shown at the points 7, 8 and 9. The section is formed by cutting or partially cutting or punching the remainder of the section away from the main side. It will be noted that the connecting point 7 is not opposite any of the other points, but is opposite the space between the points 8 and 9. Similarly, the point 8 is between the points 7 and 9, and the point 9 is opposite the space between the point 7 and the corner 10 of the section. The corner 11 of the section is also free. As a result of this construction, it is possible to take hold of the edge of the section 5, for instance, with a pair of pliers adjacent the corner 11 and twist off the metal at the point 9 and then by twisting the section 5 in the opposite direction to break the point of connection 7. This would leave the section 5 connected only at the bottom so that it could then be entirely broken out by twisting at the point 8. This construction by reason of the fact that the points 7 and 9 are not at the edge of the box, leaves smooth edges in the opening 12 at the edge of the box.

With such a construction it is possible to break out or detach the section without twisting the side of the box even though the box be formed of thin or light weight metal. In the form shown, a meter adapter 13 is secured to the box and the wires from the meter can be readily laid in to the opening 12 before the meter adapter is in place.

The detachable section 5 may itself have a smaller removable section 14 which can be broken out in case it is not desired to have the large opening 12. This part 14 is secured to the part 5 at the point 15 which is adjacent one of the points of connection such as 8 between the section 5 and the body 6 of the box. This makes it possible to knock out the part 14 without distorting the part 5 since the part 5 is connected to the main side 6 at the point 8 adjacent the point 15.

It has been customary in this art to refer to removable or detachable sections of this general character as "knock outs" which term indicates the method by which they are removed. In my invention the removable section may be termed a "twist out" since that is the preferred method of removing the section without distorting or warping the side of the box.

I claim:

1. An electric cut-out box having a part of one side extending from one edge inward readily removable, said part being connected to the adjoining body at points arranged in staggered relation whereby the said part may be removed by twisting it from side to side so as to break the connections one at a time.

2. An electric cut-out box having a part of one side extending from one edge inward readily removable, said part being connected to the adjoining body at points arranged in staggered relation, whereby the said part may be removed by twisting it from side to side so as to break the connections one at a time, one of said points of connection being at the bottom of said removable part.

3. An electric cut-out box having a part of one side at the edge removable but connected at the edges to the adjoining body at a plurality of points, one edge of said part and the body being unconnected at the edge of the box, said removable part and box body being unconnected at the points opposite the points of connection.

4. An electric cut-out box having a part of one side at the edge removable but connected at the edges to the adjoining body at a plurality of points, said body and removable part being unconnected at the edge of the box and said removable part and box body being unconnected at the points opposite said points of connection.

ROSCOE RATCLIFFE.